US008756285B2

(12) United States Patent
Kosuda

(10) Patent No.: US 8,756,285 B2
(45) Date of Patent: Jun. 17, 2014

(54) IMAGE PROCESSING APPARATUS THAT SENDS APPARATUS-SPECIFIC INFORMATION EMAIL TO ANOTHER IMAGE PROCESSING APPARATUS

(75) Inventor: Shota Kosuda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 396 days.

(21) Appl. No.: 12/838,880

(22) Filed: Jul. 19, 2010

(65) Prior Publication Data
US 2011/0029624 A1 Feb. 3, 2011

(30) Foreign Application Priority Data

Jul. 31, 2009 (JP) .................... 2009-178748

(51) Int. Cl.
G06F 15/16 (2006.01)
H04N 1/00 (2006.01)
(52) U.S. Cl.
CPC ....... H04N 1/00204 (2013.01); H04N 1/00209 (2013.01); H04N 1/00114 (2013.01)
USPC .......................... 709/206; 358/402
(58) Field of Classification Search
CPC .......... H04N 1/00114; H04N 1/00204; H04N 1/00209
USPC ........................................ 709/206
See application file for complete search history.

(56) References Cited

U.S. PATENT DOCUMENTS

| 6,437,873 | B1 * | 8/2002 | Maeda | 358/1.15 |
| 8,190,690 | B2 * | 5/2012 | Ushida | 709/206 |
| 2004/0114194 | A1 * | 6/2004 | Eguchi et al. | 358/400 |
| 2008/0117475 | A1 * | 5/2008 | Ozawa et al. | 358/435 |

FOREIGN PATENT DOCUMENTS

| JP | 2002-259312 A | 9/2002 |
| JP | 2003-078649 A | 3/2003 |
| JP | 2003-256339 A | 9/2003 |
| JP | 2004-110757 A | 4/2004 |
| JP | 2005-275811 A | 10/2005 |

* cited by examiner

Primary Examiner — Shirley Zhang
(74) Attorney, Agent, or Firm — Marvin A. Motsenbocker; Mots Law, PLLC

(57) ABSTRACT

An image processing apparatus including: a first email creator to create a first email including first header information and a message body based on a user's request; a second email creator to create a second email including second header information containing a request for acquisition of a status of an external apparatus when the first email is created and to send the second email to the external apparatus; an email analyzer to receive a third email containing a status response to the second email from the external apparatus and to analyze the third email to output an analysis result of whether the external apparatus can receive an email; and a controller to send the first email when the analysis result is that the external apparatus can receive and to notify the user that the external apparatus cannot receive when the analysis result is that the external apparatus cannot receive.

15 Claims, 12 Drawing Sheets

MFP OF FIG. 2 IN EMBODIMENT 1 OF INVENTION

NETWORK CONNECTION IN EMBODIMENT 1 OF INVENTION

FIG. 5

HEADER INFORMATION EXAMPLE INCLUDING STATUS REQUEST IN FIG. 4

30

Date : Mon, 11 May 2009 21:41:28 +0900
From : mfp200@sample.com
To : mfp100@sample.com
Subject : MFP Status Request
Disposition-Notification-To : mfp100@example.com
X-Printer-Status-Request: get
Message-ID : <20A79708.000000A8.00000001.00000001@example.com>
MIME-Version : 1.0

(THE REST IS OMITTED)

31
33
32
34

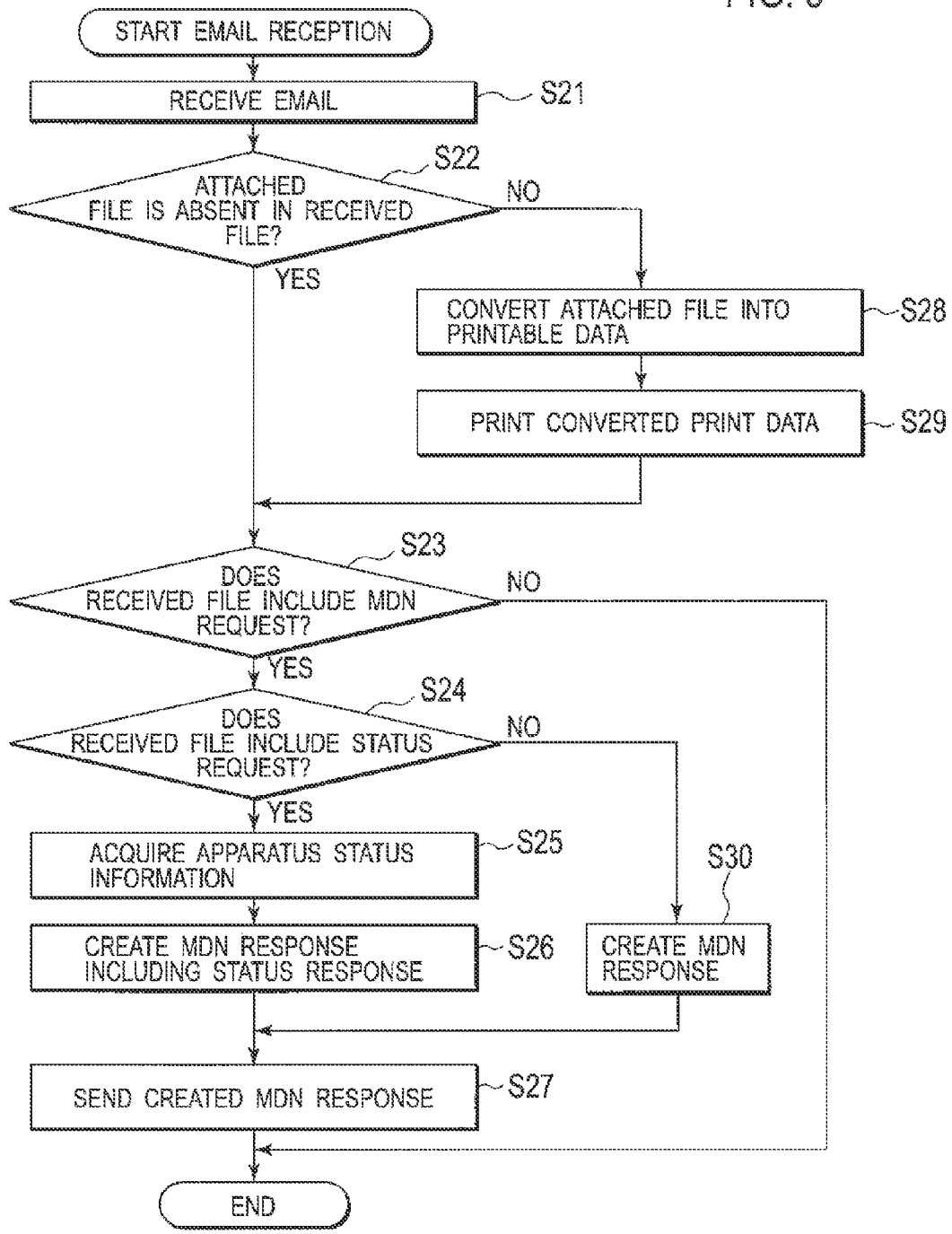

FIG. 7

HEADER INFORMATION EXAMPLE INCLUDING STATUS RESPONSE OF FIG. 6

```
Date: Mon, 11 May  2009  21:42:55 +0900
From: mfp200@sample.com
To: mfp100@example.com
Subject: MFP Status Response
Message-ID: < 20A87EF0.00000097.00000001.00000001@sample.com >
MIME-Version: 1.0
Content-Type: multipart / report; report-type = disposition-notification;
 boundary ="=_05478541753747125087054 7842208_="

--- =_05478541753747125087054 7842208_=
Content-Type: text / plain ; charset ="us-ascii"
Content-Transfer-Encoding: 7bit (OMITTED)

--- =_05478541753747125087054 7842208_=
Content-Type: message / disposition-notification
Content-Transfer-Encoding: 7bit Final-Recipient: rfc822; mfp200@sample.com
Original-Message-ID: < 20A79708.000000A8.00000001.00000001@example.com >
Disposition: automatic-action / MDN-sent-automatically; dispatched
X-Printer-Status-Response: error

--- =_05478541753747125087054 7842208_=

(THE REST IS OMITTED)
```

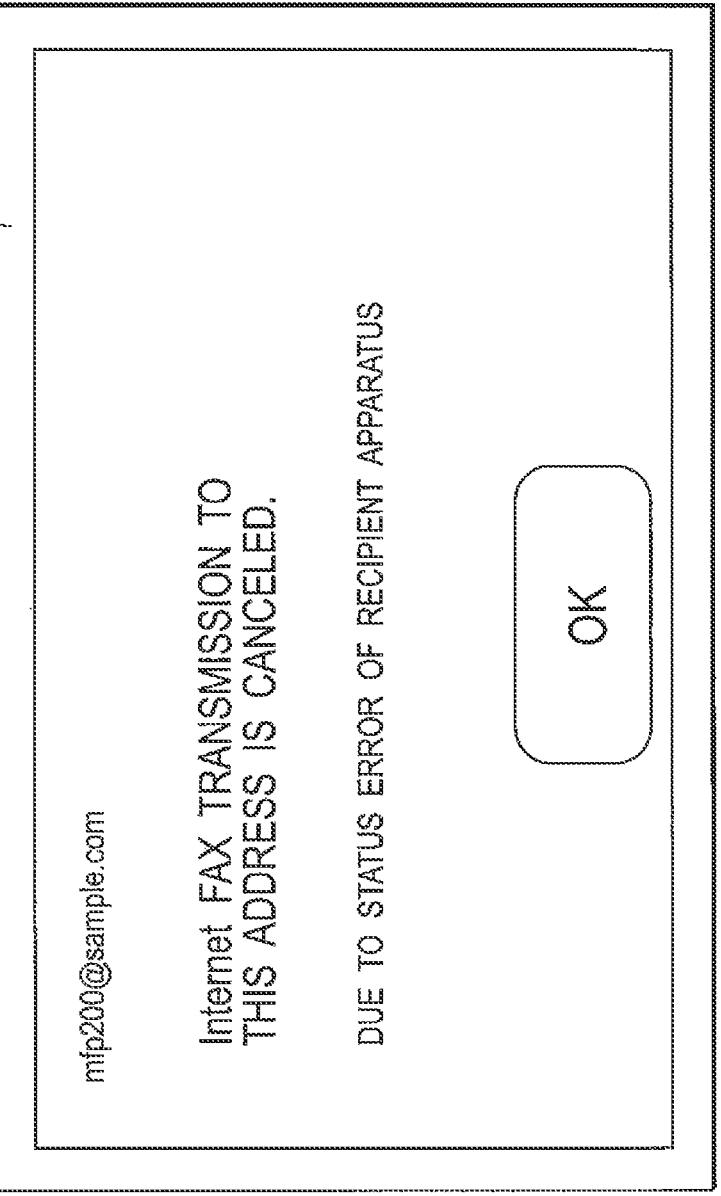

CONFIGURATION OF MFP OF FIG. 2 IN EMBODIMENT 2 OF INVENTION

FIG. 12

HEADER INFORMATION EXAMPLE INCLUDING STATUS RESPONSE IN FIG. 11

```
Date: Mon, 11 May 2009  21:42:55 +0900
From: mfp200@sample.com
To: mfp100@example.com
Subject: MFP Status Response
Message-ID: < 20A87EF0.00000097.00000001.00000001@sample.com >
MIME-Version: 1.0
Content-Type: multipart / report; report-type = disposition-notification;
 boundary ="=_05478541753747125087054 7842208_="

-- =_05478541753747125087054 7842208_=
Content-Type: text / plain ; charset ="us-ascii"
Content-Transfer-Encoding : 7bit (OMITTED)

-- =_05478541753747125087054 7842208_=
Content-Type: message / disposition-notification
Content-Transfer-Encoding: 7bit Final-Recipient: rfc822; mfp200@sample.com
Original-Message-ID: <20A79708.000000A8.00000001.00000001@example.com >
Disposition: automatic-action / MDN-sent-automatically; dispatched
X-Printer-Status-Response: processing

-- =_05478541753747125087054 7842208_=

(THE REST IS OMITTED)
```

40, 41, 42, 42, 43, 44A

IMAGE PROCESSING APPARATUS THAT SENDS APPARATUS-SPECIFIC INFORMATION EMAIL TO ANOTHER IMAGE PROCESSING APPARATUS

CROSS REFERENCE TO RELATED APPLICATIONS

This application claims priority based on 35 USC 119 from prior Japanese Patent Application P2009-178748 filed on Jul. 31, 2009, entitled "IMAGE PROCESSING APPARATUS", the entire contents of which are incorporated herein by reference.

BACKGROUND OF THE INVENTION

1. Field of the Invention

The invention relates to an image processing apparatus including a function to transmit scanned image data or other types of data by electronic mail (hereinafter, just referred to as email).

2. Description of Related Art

There is a conventional apparatus having a function to transmit a file of a scanned image as an attachment of an email and to, upon receiving an email with an attached file, print the attached file. Hereinafter, such a function is referred to as Internet FAX, and the transmission and reception functions of Internet FAX are referred to as Internet FAX transmission and Internet FAX reception, respectively. Internet FAX also has a function in which a sender (=a transmission apparatus) adds a message disposition notification (MDN) request to an email to be transmitted by Internet FAX and sends the email, whereas a recipient (=a reception apparatus) having received the email with the MDN request added sends an email as an MDN replay to the sender of the received email to notify the sender that the email sent by Internet FAX has been received. Such a technique concerning the MDN request and response is described in Japanese Patent Laid-open Publication No. 2003-256339.

The conventional image processing apparatus, however, has a risk that a transmitted email may be read by a third party. Specifically, the transmitted email goes through two or more email servers or may be stored in an email box before arriving at the receiving apparatus. For this reason, even if the reception apparatus is powered off, the transmission apparatus cannot detect the status of the reception apparatus and normally sends the email. The email is therefore stored in the email box for a long time and may be read by a third party before the reception apparatus is powered on.

SUMMARY OF THE INVENTION

A first aspect of the invention is an image processing apparatus, including: a communication unit configured to exchange mails with an external apparatus via a network; a first email creator configured to create a first email including first header information and a message body based on a request of a user; a second email creator configured to create a second email including second header information containing a request for acquisition of a status of the external apparatus when the first email is created, and to send the second email to the external apparatus through the communication unit; an email analyzer configured to receive a third email containing a status response to the second email from the external apparatus through the communication unit, and to analyze the third email to output an analysis result of whether the external apparatus can receive an email; and a controller configured to send the first email through the communication unit when the analysis result by the email analyzer is that the external apparatus can receive, and alternatively to notify the user that the external apparatus cannot receive when the analysis result is that the external apparatus cannot receive.

According to the first aspect, sending the second email before sending the first email makes it possible to detect that the apparatus as a recipient is not powered on or is out of toner. This can prevent the apparatus as a sender from sending data to be transmitted while the apparatus as the recipient is not ready for printing. It is therefore possible to prevent an email from being stored in the email box for a long time, thus reducing the risk that the email may be read by a third party.

A second aspect of the invention is an mage processing apparatus including the first aspect and a division controller configured to divide the first email created by the first email creator into pieces in transmission units. The division controller sends the second email corresponding to the first email through the communication unit and sequentially sends the pieces of the first email through the communication unit when judging, based on the status response to the second header information, that the external apparatus can receive an email.

According to the second aspect, in addition to the aforementioned effects, even when the read image is divided into multiple emails for transmission, only sending the second email makes it possible to detect whether the apparatus as a recipient of the emails is powered on or whether the apparatus as a recipient is ready for printing. This can shorten the period of time when an email is stored in the email box. This also reduces the risk that an email can be read by a third party.

Note that the invention has other aspects.

BRIEF DESCRIPTION OF THE DRAWINGS

FIG. 5 is a view showing an example of header information including a status request of FIG. 4.

FIG. 6 is a flowchart showing an operation of the MFP of FIG. 1 on the receiving side in Embodiment 1.

FIG. 7 is a view showing an example of header information including a status response of FIG. 6.

FIG. 8 is a view showing an example of a screen displayed by a display/operation unit shown in FIG. 1 when Internet FAX transmission is canceled in FIG. 4.

FIG. 12 is a view showing an example of header information including a status response of FIG. 11.

DETAILED DESCRIPTION OF EMBODIMENTS

Embodiments of the invention are explained with reference to the drawings. All of the drawings referenced herein are

[Embodiment 1]

(Image Processing Apparatus of Embodiment 1)

Figure 2:
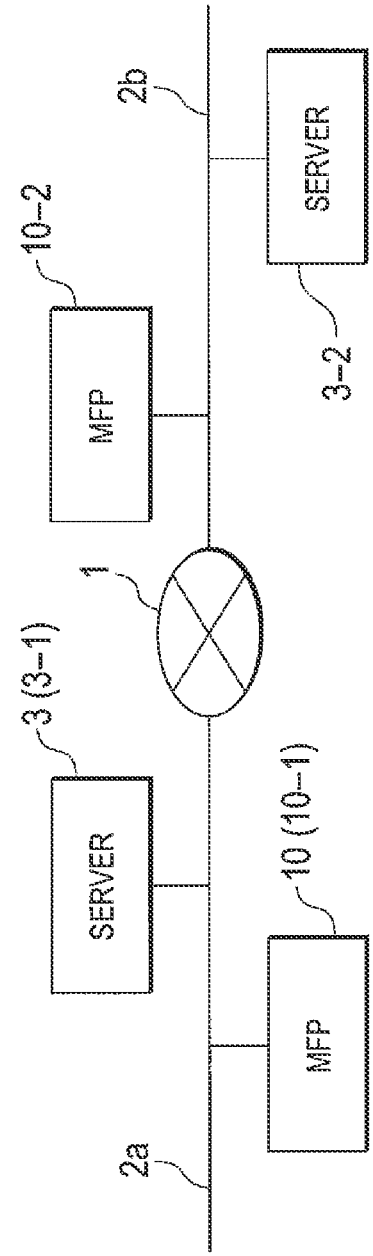
FIG. 2 is a block diagram schematically showing a network connection including image processing apparatuses in Embodiment 1 of the invention.

FIG. 2 is a block diagram schematically showing a network connection including image processing apparatuses of Embodiment 1 of the invention.

The image processing apparatuses of Embodiment 1 are multi-function products/printers/peripherals (Hereinafter, referred to as MFPs) 10 each having, for example, a function to read (scan) an image with a scanner, a function to send and receive data, a function to print data, and other functions. MFPs 10 include MFPs 10-1 and 10-2. MFP 10-1 among MFPs 10 is connected to server 3-1 among multiple servers 3 through local network 2a and is also connected to Internet 1. MFP 10-2 is similarly connected to another server 3-2 through local network 2b and is also connected to Internet 1. MFPs 10-1 and 10-2 and servers 3-1 and 3-2 are configured to communicate with each other in accordance with TCP/IP (transmission control protocol/Internet protocol) which is a standard Internet protocol.

MFPs 10-1 and 10-2 have the same configuration while being different in some setting information such as email addresses. Servers 3-1 and 3-2 include functions as an SMTP (simple mail transfer protocol) server and a POP (post office protocol) server. SMTP is a protocol for sending and forwarding emails, and POP is a protocol for, in response to a request from a user, authenticating the user and delivering emails stored in an email server.

Each of servers 3-1 and 3-2 is configured to accept an email transmission request from MFP 10-1 or 10-2 as an SMTP client and accept an email reception request from MFP 10-1 or 10-2 as a POP client, thus performing processing as an email server. Moreover, servers 3-1 and 3-2 are configured to perform a process for relaying emails received from an SMT client if necessary.

In Embodiment 1, it is assumed that: MFP 10-1 has a serial number of 001, an IP address of 192.168.101.101, and an email address of mfp100@example.com and MFP 10-2 has a serial number of 002, an IP address of 192.168.102.102, and an email address of mfp200@sample.com.

An email includes a message body and a portion called header information including header fields indicating relay servers, the sender's email address, and the like. The header fields are described in the form of Field name: Field value. Examples of the header fields are shown below.

Return-Path: an email address transmitted as a source in the SMTP communication

Received: email transfer agents which the email goes through before reaching the recipient and date and time when the email goes through each email transfer agent Message-ID: a unique number assigned to this email In-Reply-To: a list of the message-ID of an email as a response to this email and the like.

From: one or more email addresses and optionally names of authors of this email

Sender: the email address and optionally name of the sender

To: one or more email addresses and optionally names of recipients

Cc/Bcc: one or more email addresses and optionally names of recipients of carbon copies and blind carbon copies Reply-To: an email address that the sender specifies to reply to this email Subject: a short sentence indicating the subject (This field is called "sabujekuto" or "kenmei" in Japanese. Re: and Fw: are commonly automatically added to the top of each subject of reply and forwarded emails, respectively.)

Date: Time and date when this email is created

MIME-Version: the version of MIME

Figure 1:
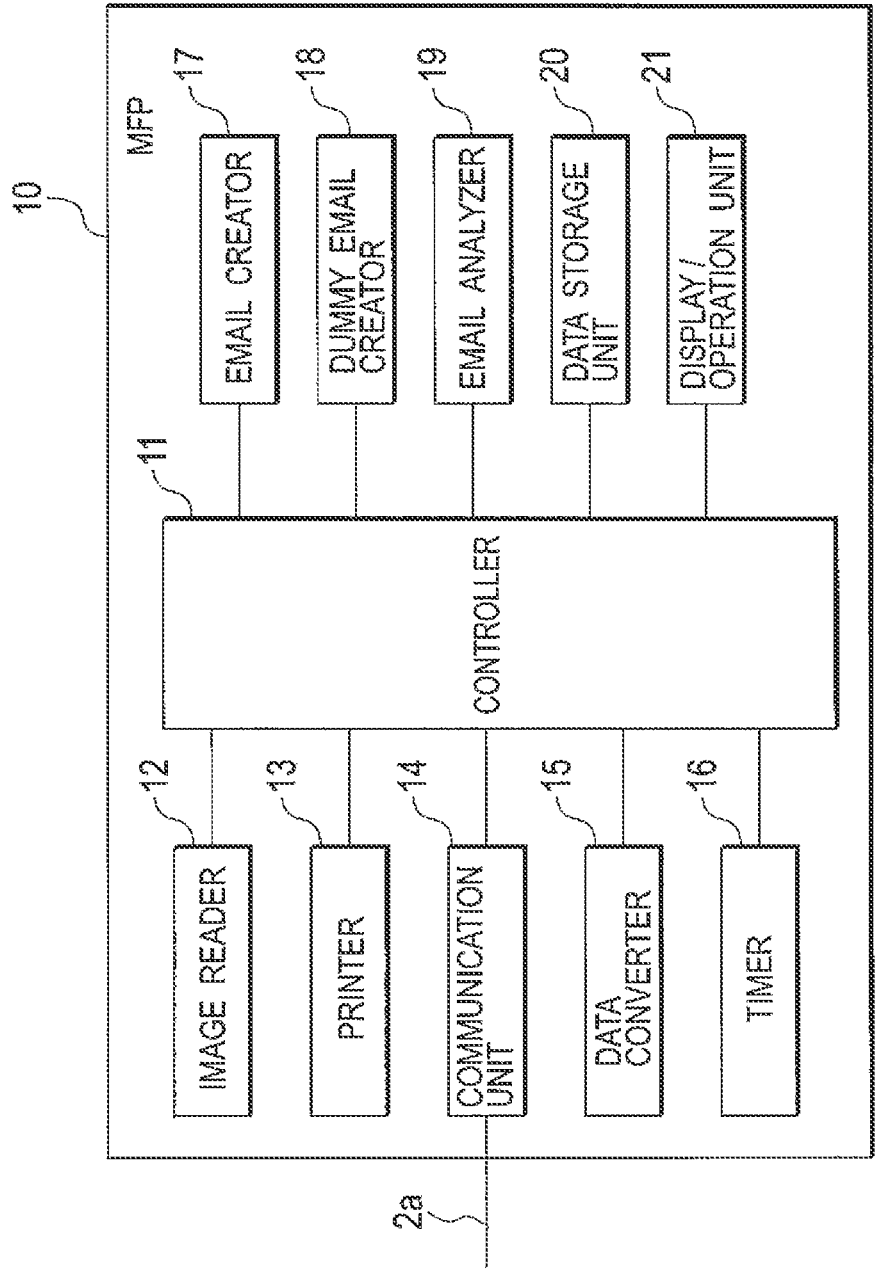
FIG. 1 is a block diagram showing one of the MFPs of FIG. 2 in Embodiment 1 of the invention.

FIG. 1 is a block diagram, showing one of the MFPs of FIG. 2 in Embodiment 1 of the invention.

Each of MFPs 10 includes controller 11 controlling the whole apparatus of MFP 10. Controller 11 is connected to image reader 12, printer 13, communication unit 14, data converter 15, timer 16, email creator 17, dummy email creator 18, email analyzer 19, data storage 20, and display/operation unit 21.

Image reader 12 is a unit configured to read (scan) a document. For example, image reader 12 is a scanner provided to MFP 10 and includes a function to read (scan) a document set thereto. Printer 13 interprets print data described with a PostScript page description language, for example, and makes a print according to the data. Communication unit 14 includes a function to exchange data with external apparatuses using various types of protocols. For example, when MFP 10 sends an email, communication unit 14 performs processing as the SMTP client. When an email is sent to MFP 10, communication unit 14 performs processing as the POP client and has a function to receive the email.

Data converter 15 is configured to perform file format conversion, for example, such as conversion of TIFF (tagged image file format) data to PostScript data or conversion of PostScript data to TIFF data. Timer 16 is a time counter and has a function to measure time in response to an instruction from controller 11.

Email creator 17 as a first email creator includes a function to create data in a format transmittable as a first email when MFP 10 sends a file by email. For example, email creator 17 creates data of the message body for attaching the file to be sent or adds an MDN request in an email format as first header information.

Dummy email creator 18 as a second email creator has a function to create a second email (for example, a dummy email) in the email format based on an email with an attached file intended to be sent from MFP 10, for example. The second email has the same destination as that of the first email, includes no attached file, and has a blank message body. Moreover, the second email includes second header information for checking the condition of MFP 10-2 on the receiving side. Dummy email creator 18 is configured to add an MDN request to the second email in a similar manner to email creator 17.

Email analyzer 19 is configured to analyze a received email. For example, email analyzer 19 acquires a file attached to the received email or analyzes whether the received email includes an MDN request. If the received email includes the MDN request, email analyzer 19 recognizes that transmission of an MDN response is requested. Data storage 20 includes a function to store data, for example, including transmission data and setting values of MFP 10 and performs data management such as changing and deleting data. Display/operation unit 21 as a request acquisition unit is configured to display information of the status of MFP 10 and a menu to provide the status of MFP 10 and accept operations such as changing the settings of MFP 10 and executing the functions.

According to the configuration of Embodiment 1, in response to a request from a user through display/operation unit 21 to execute internet FAX transmission, image reader 12 reads (scans) a set document and creates image data. Data converter 15 converts the image data created by image reader 12 to a TIFF file. Email creator 17 incorporates the TIFF file generated by data converter 15 in the email format. Communication unit 14 sends the email-formatted data by email, thus implementing the Internet FAX transmission.

Furthermore, for example, when communication unit 14 receives the email with the TIFF file attached thereto from mail server 3, email analyzer 19 analyzes the received email, and data converter 15 converts the attached file to print data. Printer 13 then performs processing for printing, thus implementing the Internet FAX reception.

(Operation of Embodiment 1)

Figure 3:
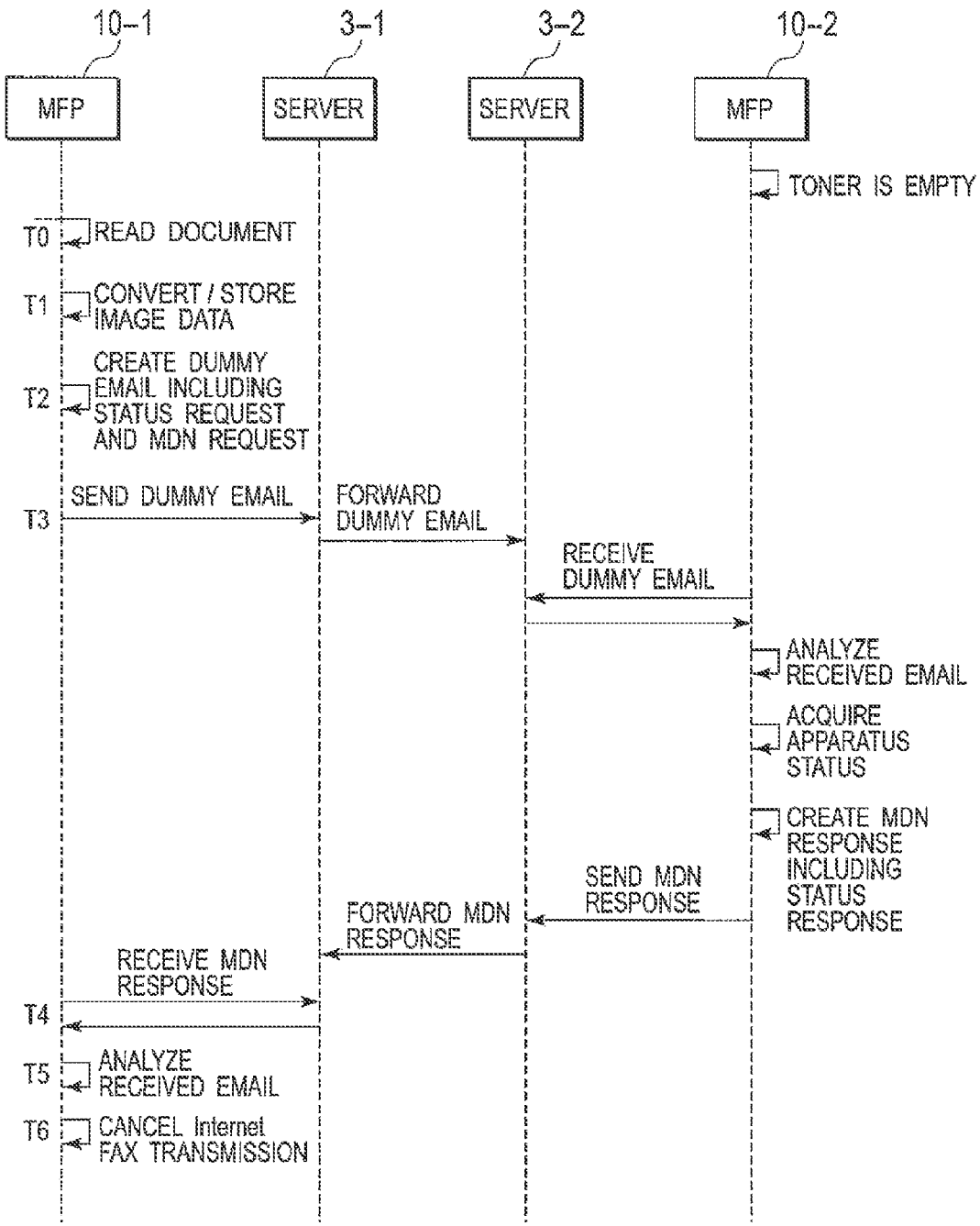
FIG. 3 is a time chart showing a message flow among the image processing apparatuses and servers of FIG. 2 in Embodiment 1.
Figure 4:
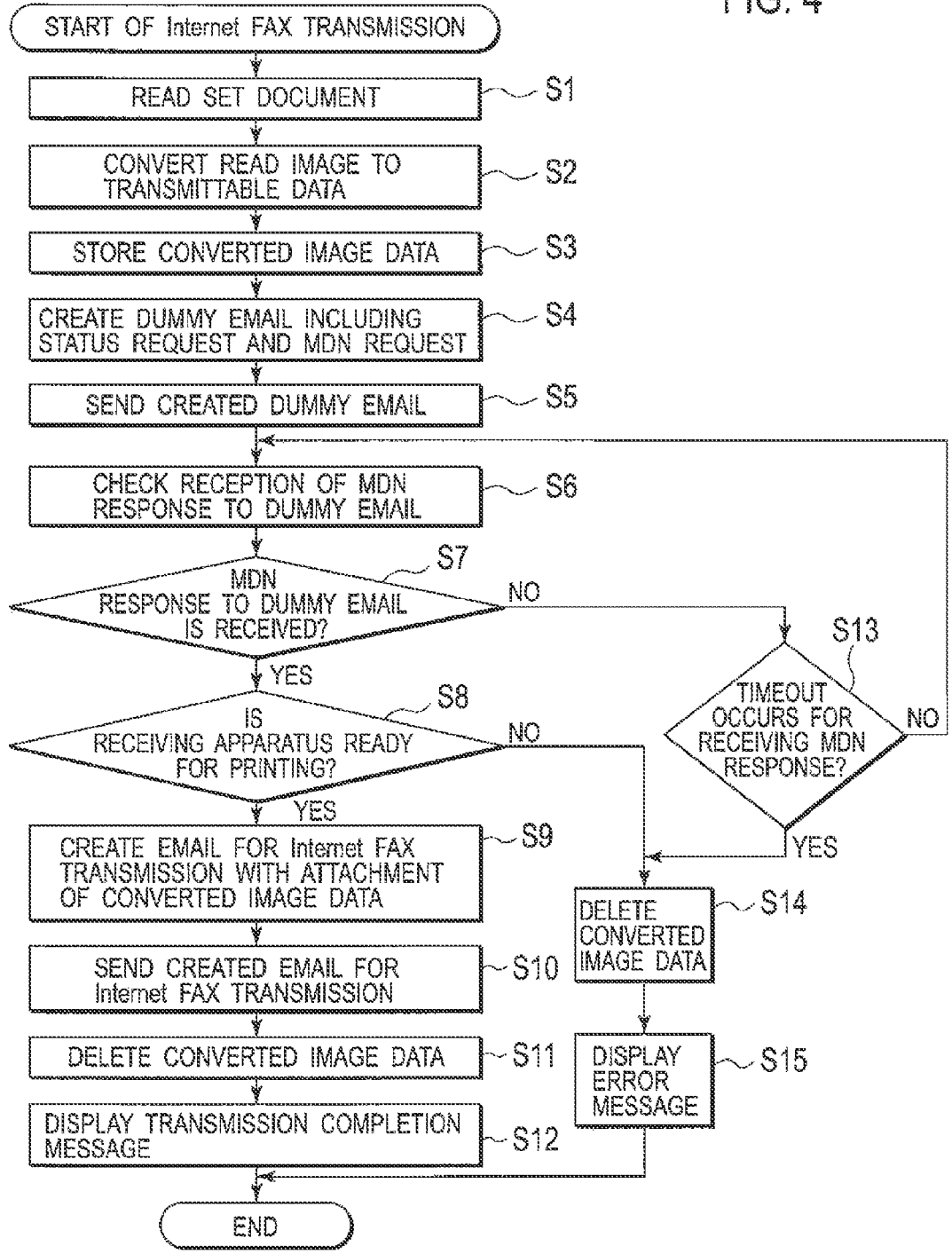
FIG. 4 is a flowchart showing an operation of the MFP of FIG. 1 on the sending side in Embodiment 1.

FIG. 3 is a time chart showing a message flow among the MFPs and servers of FIG. 2 in Embodiment 1. FIG. 4 is a flowchart showing an operation of the MFP on the sending side of FIG. 1 in Embodiment 1. FIG. 5 is a view showing an example of the header information including a status request in FIG. 4.

The operation of Embodiment 1 is described assuming the following scenario as an example: when MFP 10-2 is out of toner and cannot print, MFP 10-1 has a request for the Internet FAX transmission to MFP 10-2, detects the status of MFP 10-2 as an external apparatus and cancels the Internet FAX transmission.

At first, using FIG. 3, the message flow among the MFPs and servers is schematically described.

In step T0, a document is read (scanned) by image reader 12 of MFP 10-1. In step T1, the read image data is converted to a TIFF file by data converter 15 and is then stored in data storage 20. In step T2, a dummy email for checking the status of MFP 10-2 on the receiving side is created by dummy email creator 18. This dummy email includes the MDN request for a message disposition notification of the email and a status acquisition request (a status request, for example) for a notification of the apparatus status.

In step T3, the dummy email is transmitted to MFP 10-2 via servers 3-1 and 3-2 by communication unit 14. In MFP 10-2, email analyzer 19 analyzes the dummy email received through communication unit 14, and finds that the dummy email includes the MDN request and status request. Thus, a MDN response and a response for status request (a status response, for example) are transmitted to MFP 10-1 through communication unit 14. In MFP 10-1, a third email including the MDN response and status response is received in step T4 and is analyzed in step T5 by email analyzer 19. As a result of the analysis, email analyzer 19 detects that MFP 10-2, for example, is not ready for printing and informs data storage 20 and display/operation unit 21. In step T6, upon being informed by email analyzer 19 that MFP 10-2 is not ready for printing, data storage 20 deletes the TIFF data previously stored.

Next, the operation of MFP 10 on the sending side is described using FIG. 4.

In step S1, a document for the Internet FAX transmission is set to image reader 12 of MFP 10-1, and execution of the internet FAX transmission is requested to be executed with the destination address set to the email address of MFP 10-2, mfp200@sample.com. Image reader 12 reads (scans) the set document and transfers the read image data to data converter 15. In step 52, data converter 15 converts the read image data to a TIFF file allowed to be sent by Internet FAX.

In step S3, data storage 20 stores the TIFF file converted by data converter 15. In step S4, dummy email creator 18 creates a dummy email in the email format with the destination address set to mfp200@sample.com based on the email address of MFP 10-2 specified by the user. Herein, as shown in FIG. 5, the dummy email includes a blank message body, has no attached file, and includes header information 30 further including the request for acquisition of the status of MFP 10-2 as a recipient. Furthermore, the dummy email includes header information 30 with the MDN request and is transferred to communication unit 19. The dummy email may include header information 30 but not the message body.

Herein, header information 30 is a portion provided for the email separately from the message body and includes various kinds of information called the header fields. For example, as shown in FIG. 5, "From" field 31 in header information 30 of the dummy email indicates an email address of an originator as apparatus-specific information, and "From: mfp100@example.com" means that the originator of this email is MFP 10-1. "Disposition-Notification-To" field 32 indicates a MDN request, and the field value "Disposition-Notification-To: mfp100@example.com" means that the destination of the MDN response is MFP 10-1. "X-Printer-Status-Request" field 33 indicates that this email is the status request. "Message-ID" field 34 includes an identifier of this email.

In step S5, communication unit 19 communicates with server 3-1, which is an email server, through local network 2a using SMTP and sends the dummy email to the email address of MFP 10-2. After transmission of the email by MFP 10-1 is finished, server 3-1 delivers the email transmitted by MFP 10-1 to server 3-2 through several servers on the Internet. Server 3-2 stores the email received from MFP 10-1 in an email box corresponding to the mfp200@sample.com.

FIG. 6 is a flowchart showing an operation of the MFP on the receiving side of FIG. 1 in Embodiment 1. FIG. 7 is a view showing an example of the header information including the status response of FIG. 6. FIG. 8 is a view showing an example of the Internet FAX transmission cancel screen of the display/operation unit of FIG. 1 in FIG. 4.

Next, the operation of MFP 10-2 in receiving the dummy email transmitted by MFP 10-1 from server 3-2 and processing the same is described using FIG. 6.

In step S21, communication unit 14 of MFP 10-2 communicates with server 3-2 through local network 2b using POP and receives an email which is stored in the email box corresponding to mfp200@sample.com and is addressed to MFP 10-2 from MFP 10-1. In steps S22, S23, and S29, email analyzer 19 receives the email from communication unit 14, analyzes the email, and acquires a request for notification of the status and transmission of the MDN response based on the status request and MDN request (YES).

In steps S25 and S26, based on the result of the analysis, email analyzer 19 notifies email creator 17 of the message-ID of the received dummy email and asks to create third header information 40 including the MDN response and status response with the email address of MFP 10-1 of mfp100@example.com specified as the destination address. Based on the information notified by email analyzer 19, email creator 17 creates email-format data including header information 40 of the MDN response in which the destination address is mfp100@example.com and the current status information of MFP 10-2 is included as shown in FIG. 7.

In header information 40 shown in FIG. 7, "To" field 41 (mfp100@example.com) indicates the destination address of this email. The string "multipart/report; report-type=disposition-notification" of "Content-Type" field 42 indicates that this email is an MDN response. Original-Message-ID" field 43 indicates an identifier of the email requesting an MDN. This field allows the recipient of the MDN response to know which MDN request the received MDN response corresponds to. "X-Printer-Status-Response" field 44 indicates the apparatus status, and the string of "error" indicates that the apparatus is not ready for printing.

Sine it is assumed that MFP 10-2 cannot print because of toner empty, the status indicating that the printer is not ready for printing is added to the MDN response. Next, in step S27, communication unit 14 communicates with server 3-2 via local network 2b using SMTP and sends an email of the MDN response as a third email created by email creator 17 to the email address of MFP 10-1. After the transmission of the email by MFP 10-2 is completed, server 3-2 delivers the email sent by MFP 10-2 through several email servers on the Internet to server 3-1. Server 3-1 stores the email from MFP 10-2 in an email box corresponding to mfp100@example.com.

Hereinafter, again in FIG. 4, the operation of MFP 10-1 in receiving the MDN response sent by MFP 10-2 and performing processing is described.

In step S6, communication unit 14 of MFP 10-1 communicates with server 3-1 via local network 2a using POP and receives the MDN replay addressed to MFP 10-1 from MFP 10-2 and stored in the email box corresponding to mfp100@example.com.

In step S7, email analyzer 19 receives the received email from communication unit 14 and analyzes the email. Email analyzer 19 judges based on "Original-Message-ID field" 43 of FIG. 7 and the like that the received email is an MDN response to the dummy email sent to MFP 10-2 (YES). In step S8, based on the value "error" of "X-Printer-Status-Response" field 44 indicating the status of MFP 10-2 added to the MDN response, email analyzer 19 detects that MFP 10-2 is not ready for printing and notifies data storage 20 and display/operation unit 21.

In step S14, upon being notified by email analyzer 19 that MFP 10-2 is not ready for printing, data storage 20 deletes the TIFF file stored in order for the user to perform Internet FAX transmission to MFP 10-2.

Furthermore, in step S15, upon being notified that the printer is not ready for printing, display/operation unit 21 displays an error message as shown in FIG. 8.

The above description shows the case where the MDN response of MFP 10-2 to the dummy email sent by MFP 10-1 is returned to MFP 10-1. However, in some cases, the MDN response including the status response of MFP 10-2 does not return, for example, when MFP 10-2 is powered off.

Accordingly, in step S13, controller 11 of MFP 10-1 judges that the printer is not ready for printing when not receiving the MDN response to the dummy email for a predetermined period of time after sending the dummy email. Controller 11 then notifies data storage 20 and display/operation unit 21 that MFP 10-2 is not ready for printing in the same way as the above description. In step S14, the storage unit 20 deletes the stored TIFF file, and in step S15, display/operation unit 21 displays an error message indicating that the Internet FAX transmission has failed because the printer is not ready for printing to notify the user.

In step S8, when receiving the MDN response indicating that MFP 10-2 is ready for printing, email analyzer 19 of MFP 10-1 receives the received email from communication unit 14, analyzes the email, and judges that the received email is the MDN response to the dummy email sent to MFP 10-2. Furthermore, based on the status of MFP 10-2 added to the MDN response, email analyzer 19 detects that MFP 10-2 is ready for printing and notifies dummy email creator 18. In this case, "X-Printer-Status-Response" field 44 of the header information of the MDN response shown in FIG. 7 includes a string "processing" not "error" because MFP 10-2 is ready for printing.

In step S9, email creator 17 acquires the TIFF file stored by data storage 20 for Internet FAX transmission and creates email-formatted data having the destination address of mfp200@sample.com and including the TIFF file attached thereto. In step S10, communication unit 14 sends the email created by email creator 17 to the email address of MFP 10-2 via server 3-1 as the email server.

In step S11, upon being notified that the transmission of communication unit 14 is completed, data storage 20 deletes the TIFF file already transmitted. In step S12, upon being notified that the transmission by communication unit 19 is completed, display/operation unit 21 displays a message indicating the completion of the internet FAX transmission to MFP 10-2 to notify the user.

As a result of the Internet FAX transmission of MFP 10-1, MFP 10-2 receives the email sent by MFP 10-1 via server 3-2 as the email server by Internet FAX, and printer 13 prints the data of the email.
(Effect of Embodiment 1)

According to Embodiment 1, by sending a dummy email to MFP 10-2 as a recipient, MFP 10-1 (image processing apparatus) can know the status of the recipient through the MDN response before performing Internet FAX transmission. Accordingly, the Internet FAX transmission can be avoided while the recipient has any fault or the like. Specifically, MFP 10-1 does not transmit the first transmission email when the printer is not ready for printing because MFP 10-2 is powered off or is out of toner. It is therefore possible to prevent emails from being stored in the email box of server 3-2 for a long time, thus reducing the risk that emails can be read by a third party.

[Embodiment 2]
(Configuration of Embodiment 2)

Figure 9:
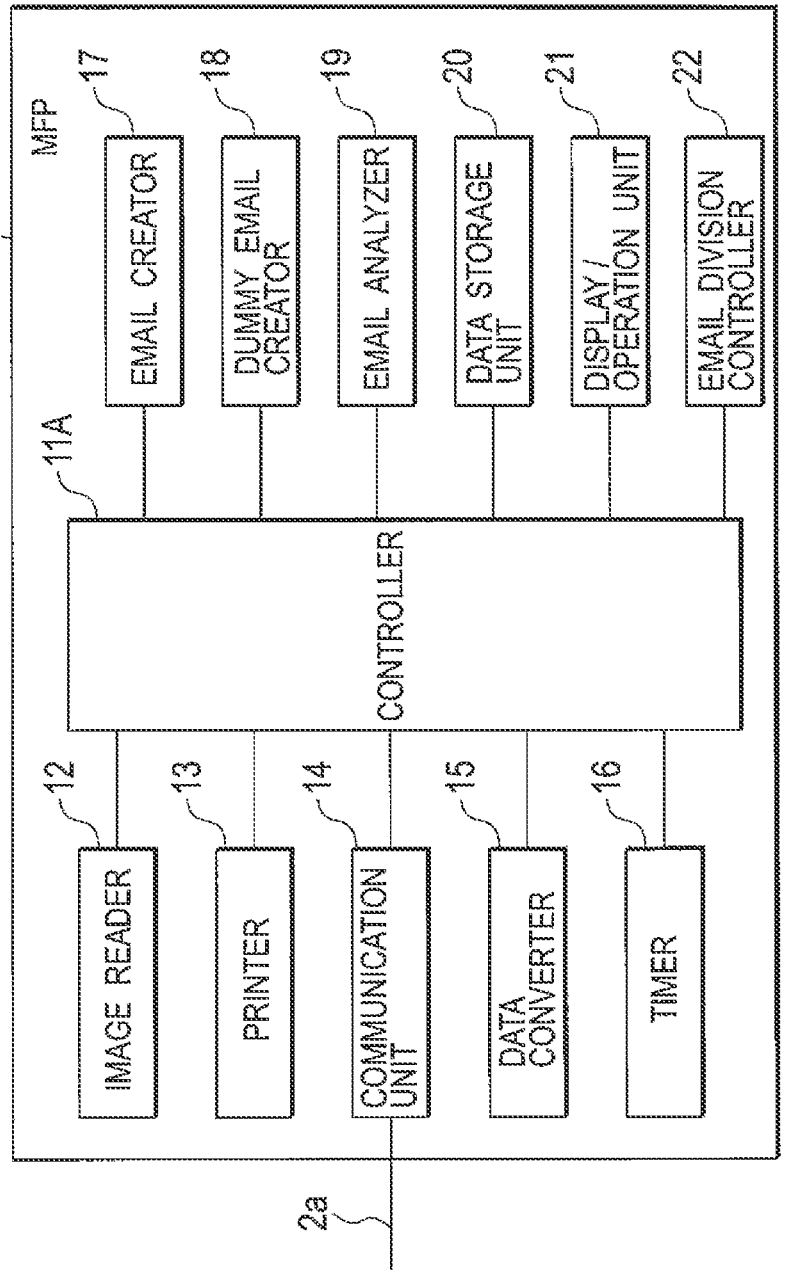
FIG. 9 is a block diagram showing one of the MFPs of FIG. 2 in Embodiment 2 of the invention.

FIG. 9 is a block diagram showing one of the MFPs of FIG. 2 in Embodiment 2 of the invention. The same elements as those of FIG. 1 showing Embodiment 1 are given same referential numerals and symbols.

The configuration of MFPs 10A of Embodiment 2 is substantially the same as that of MFPs 10 of Embodiment 1. Specifically, the configuration of Embodiment 2 differs from that of MFPs 10 of Embodiment 1 in further including email division controller 22. Email division controller 22 is configured to control image reader 12, communication unit 19, data converter 15, email creator 17, and data storage unit 20 via controller 11 for controlling division and transmission of emails at the internet FAX transmission. For example, multiple pages of the document are read and then separated into different files page by page, and the files are transmitted with different emails (hereinafter, referred to as divisional Internet FAX transmission). In other cases, a large email is divided into multiple emails for Internet FAX transmission.

The configuration of Embodiment 2 is almost the same as the configuration of Embodiment 1, but additionally includes email division controller 22. Accordingly, similarly to the case of Embodiment 1, in response to the request from the user for execution of Internet FAX transmission through display/operation unit 21, image reader 12 reads (scans) a document and creates image data, and data converter 15 converts the image data into a TIFF file. Dummy email creator 18 incorporates the TIFF file converted by email creator 17 into an email format, and then communication unit 14 can send the same by email.

Furthermore, communication unit 14 receives an email with an attached file from the email server, and email analyzer 19 analyzes the email. Data converter 15 converts the attached file into print data, and printer 13 can then print the file.

The network connection of Embodiment 2 is the same as that of Embodiment 1 shown in FIG. 2. Servers 3-1 and 3-2 have the same functions as those of Embodiment 1.
(Operation of Embodiment 2)

Figure 10:
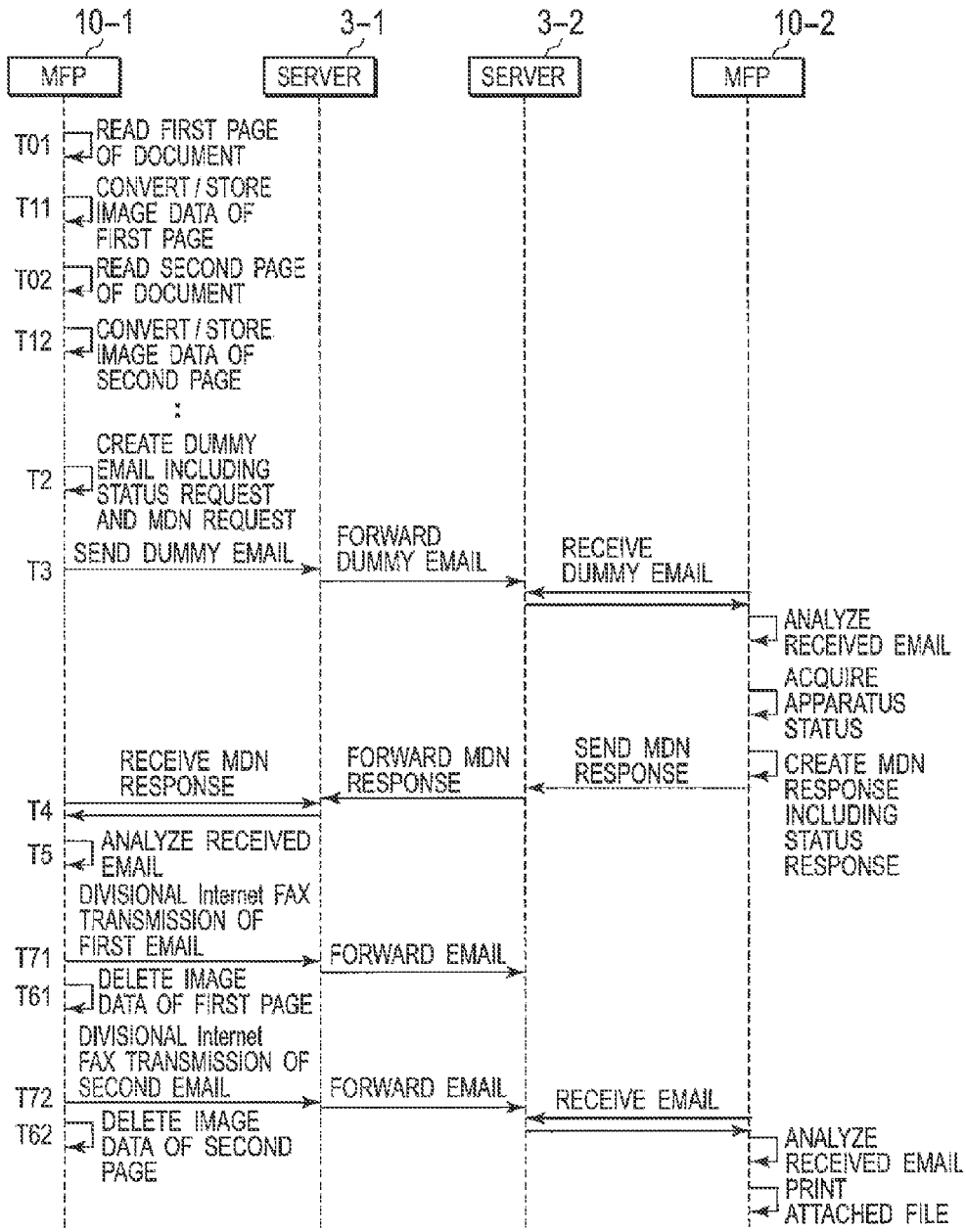
FIG. 10 is a time chart showing a message flow among the image processing apparatuses and servers of FIG. 2 in Embodiment 1.
Figure 11:
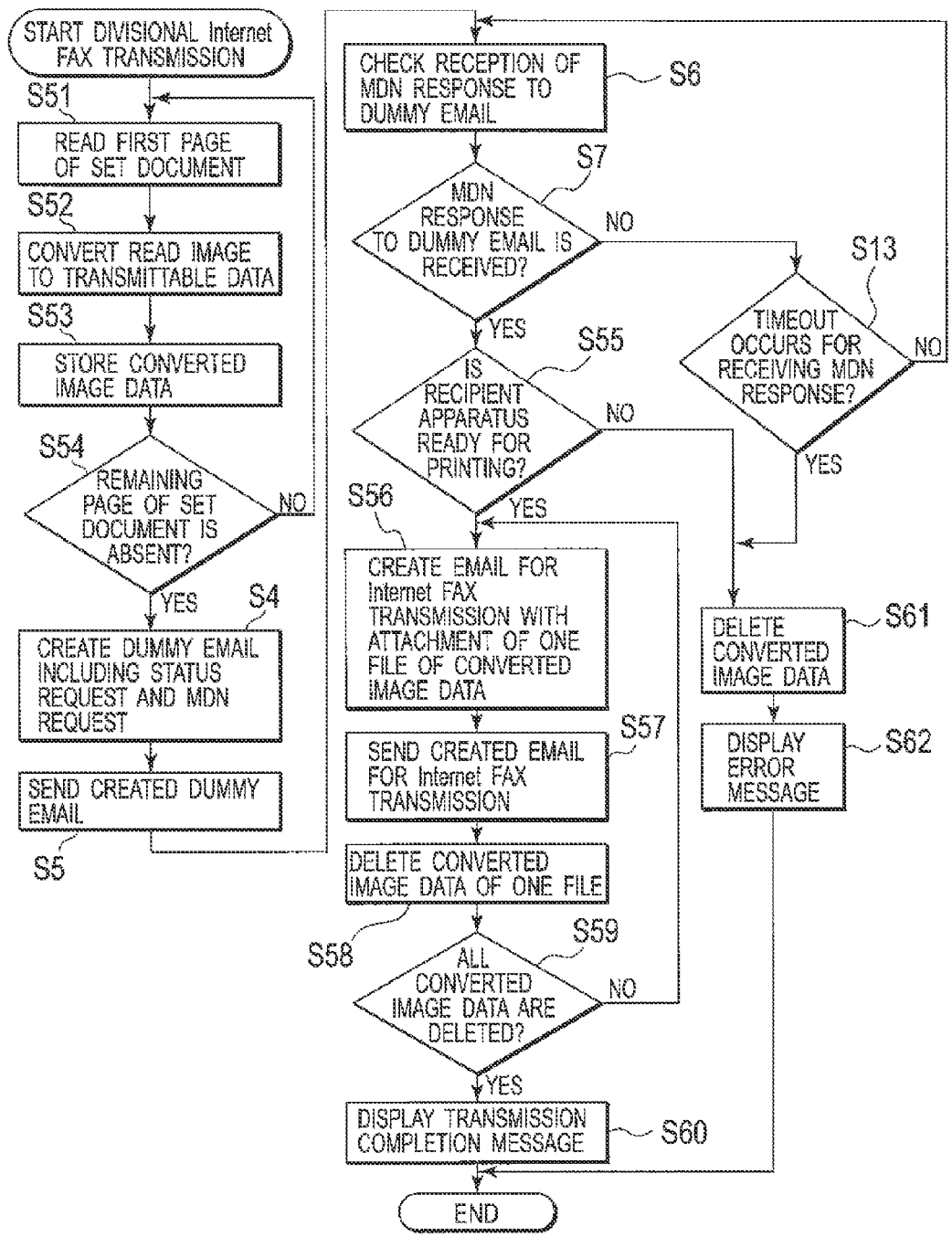
FIG. 11 is a flowchart showing an operation of the MFP of FIG. 9 on the sending side in Embodiment 2.

FIG. 10 is a time chart showing a message flow among the MFPs and servers of FIG. 2 in Embodiment 2. The same elements as those of FIG. 3 showing Embodiment 1 are given the same reference numerals or symbols. FIG. 11 is a flowchart showing an operation of the MFP on the sending side of FIG. 9 in Embodiment 2. The same elements as those of FIG. 4 showing Embodiment 1 are given the same reference numerals or symbols. FIG. 12 is a view showing an example of header information including a status response of FIG. 11.

The operation of Embodiment 2 is substantially the same as that of Embodiment 1, and the description thereof centers on differences in configuration there between using FIGS. 10 to 12.

Embodiment 2 is described using a scenario as an example where MFP 10A-2 is ready for printing and MFP 10A-1 performs the divisional Internet FAX transmission to MFP 10A-2.

First, the message flow among MFPs 10A and servers is described using FIG. 10. In step T01, the first page of the document is read (scanned) by image reader 12 of MFP 10A-1. In step T11, the read data of the first page is converted by data converter 15 into a TIFF file and is stored in data storage 20. In step T02, the second page of the document is read (scanned) by image reader 12 of MFP 10A-1. In step T12, the read image data of the second page is converted by data converter 15 into a TIFF file and is then stored in data storage 20. Image data of each page is then sequentially read (scanned), converted into a TIFF file, and then stored in data storage 20 in the same way.

Similarly to Embodiment 1, the process of creating a dummy email in step T2, the process of transmitting a dummy email, the process of analyzing the dummy email by MFP 10A-2, the process of replying with the MDN response and status response in step T3, the process of receiving the MDN response in step T9, and the process of analyzing the MDN response in step T5 are executed.

As a result of the analysis, for example, it is detected that MFP 10A-2 is ready for printing, and the image data of the first page is transmitted in step T71. At the completion of the transmission, in step T61, the image data of the first page is deleted. In step T72, the image data of the second page is transmitted. At the completion of the transmission, the image data of the second page is deleted in step S62. Subsequently, the image data of each page is sequentially transmitted and then deleted at the completion of the transmission thereof in the same way. In MFP 10A-2, the entails of the image data accumulated in the server 30-2 are received, converted to print data, and then printed by printer 13.

Next, the operation of MFP 10A on the sending side is described using FIG. 11.

The user sets several pages of the document that the user wants to send by Internet FAX to image reader 12. The user then specifies the email address of MFP 10A-2 mfp200@sample.com through display/operation unit 21 as the destination and requests execution of the divisional Internet FAX transmission.

In step S51, image reader 12 reads (scans) one of the pages of the set document and transfers the read image data to data converter 15. In step S52, data converter 15 converts the read image data into a TIFF file for one page which is allowed to be sent by Internet FAX. In step S53, data storage 20 stores the TIFF file for one page which is converted by data converter 15.

In step S54, email division controller 22 controls image reader 12, data converter 15, and data storage unit 20 to repeat the document reading in step S1, image data conversion in step S2, and saving of the converted file in step S3 until image reader 12 judges that the no more set documents remain.

Similarly to Embodiment 1, then, the process of creating a dummy email in step S9, the process of transmitting the dummy email in step S5, and the process of checking the MDN response to the dummy email in step S6, and the process of receiving the MDN response in step S7 are executed. In Embodiment 2, since MFP 10A-2 is ready for printing, MFP 10A-1 receives email-formatted data of the MDN response in which the value of "X-Printer-Status-Response" field 49A is a string "processing" indicating that MFP 10A-2 is ready for printing.

In step S55, email analyzer 19 receives the received email from communication unit 14 and then analyzes the email. Email analyzer 19 detects from the string "processing" of "X-Printer-Status-Response" field 44A that MFP 10A-2 is ready for printing (YES) and notifies email division controller 22.

Upon being notified by email analyzer 19, email division controller 22 starts to control email creator 17, communication unit 14, and data storage unit 20.

In step S56, email creator 17 acquires a TIFF file for one page from the TIFF files stored for the divisional Internet FAX transmission by data storage 20 and creates email-formatted data with the acquired TIFF file attached and the destination set to mfp200@sample.com. In step S57, communication unit 14 sends the email created by email creator 17 to the email address of MFP 10A-2 via server 3-1 as the email server.

In step S58, data storage 20 deletes the TIFF file which corresponds to the email stored and sent by communication unit 19. In step S59, email division controller 22 controls email creator 17, communication unit 19, and data storage unit 20 to repeat the process of creating an email in step S56, the process of sending the email in step S57, and the process of deleting the stored file in step S58 until data storage 20 judges that all of the TIFF files stored for the divisional Internet FAX transmission are deleted.

In step S60, upon being notified by email division controller 22 that the transmission of the divided emails is completed, display/operation unit 21 displays a message indicating completion of the divisional Internet FAX to MFP 10A-2 to notify the user. The emails of MFP 10A-1 for divisional Internet FAX transmission are sequentially transmitted to MFP 10A-2 via the email servers. MFP 10A-2 receives the emails by Internet FAX and prints the same.

In the above description, MFP 10A-1 receives the MDN response indicating that MFP 10A-2 is ready for printing. However, MFP 10A-1 operates as follows in a similar manner to Embodiment 1 when receiving the MDN response indicating that MFP 10A-2 is out of toner and is not ready for printing like Embodiment 1.

In step S6 and S7, email analyzer 19 of MFP 10A-1 receives the received email from communication unit 19 and analyzes the email to judge whether the received email is the MDN response to the dummy email sent to MFP 10A-2 in a similar manner to the description of Embodiment 1. In step S55, entail analyzer 19 detects from the status of MFP 10A-2 included in the MDN response that MFP 10A-2 is not ready for printing (NO) and notifies email divisional controller 22. Herein, since MFP 10A-2 is not ready for printing, the value of "X-Printer-Status-Response" field 49A is a string "error".

In step S61, under the control of email division controller 22, data storage 20 deletes all the TIFF files for one page stored for the divisional Internet FAX transmission. Furthermore, in step S62, upon being notified by email division controller 22, as shown in FIG. 8, display/operation unit 21 displays a message indicating that the Internet FAX transmission cannot be executed because of MFP 10A-2 is not ready for printing.

(Effect of Embodiment 2)

According to Embodiment 2, in addition to the effect of Embodiment 1, even when a read image is divided into multiple entails for transmission, whether MFP 10-2 as a recipient of the entails is powered on or whether MFP 10-2 is ready for printing can be detected by means of only an email including the status request. It is possible to shorten the period of time when the emails are stored in the email box of server 3-2, thus reducing the risk that the emails can be read by a third party.

(Modification)

The invention is not limited to the aforementioned embodiments, and various usages and modifications thereof can be made. Examples of the various usages and modifications are (a) to (i) in the following.

(a) In the above description, MFPs 10 and 10A are used as the examples of the image processing apparatus to which the invention is applied. However, copiers, facsimiles, personal computers, and the like can be used as well as MFP 10 and 10A.

(b) In Embodiments 1 and 2, MFPs 10 and 10A and servers 3 are connected to the Internet and communicate using TCP/IP. However, the invention can be implemented with another network connection.

(c) In Embodiments 1 and 2, the dummy email is sent after the document set by the user is read (scanned). However, the dummy email may be sent before the document is read (scanned) or at the same time as the document is read (scanned).

(d) In Embodiments 1 and 2, whether MFPs 10-2 or 10A-2 is ready for printing is notified as the status thereof. However, detailed information including the reason for the status such as toner empty may be notified.

(e) The MFPs 10-2 and 10A-2 may be implemented by a configuration different from those of MFPs 10-1 and 10A-1.

(f) In the description of Embodiments 1 and 2, timer 16 is connected to controller 11. However, timer 16 may be incorporated in controller 11.

(g) In the description of Embodiments 1 and 2, the dummy email does not include a message body. However, the dummy email may include a message body.

(h) In Embodiments 1 and 2, the status of the MFP on the receiving side is obtained using the MDN request and response. However, other means having an effect equivalent to the MDN request and response can be used.

(i) In the description of Embodiments 1 and 2, the first email is sent with the image file as an attachment but not limited to this. The first email may include only text data.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image processing apparatus, comprising:
    an image reader configured to scan a document and create image data;
    a data converter configured to convert the image data created by the image reader into converted image data in a form attachable to an email;
    a communication unit configured to exchange emails with external apparatuses via a network;
    a first email creator configured, based on a user's request that includes an address of a destination external apparatus where the first email is to be sent, to create a first email which includes first header information and a message body and to which the converted image data converted by the data converter is attached;
    a second email creator configured to create a second email including second header information containing a request for acquisition of the status of the destination external apparatus, and to send the second email to the destination external apparatus through the communication unit after the address of the destination external apparatus has been designated by the user in the user's request and at the same time or before the image reader scans the document;
    an email analyzer configured to receive a third email containing a status response to the second email from the destination external apparatus through the communication unit and to analyze the third email to output an analysis result of whether the destination external apparatus can print an email; and
    a controller configured to send the first email through the communication unit when the analysis result by the email analyzer is that the destination external apparatus can print an email and alternatively to notify the user that the destination external apparatus cannot print when the analysis result is that the destination external apparatus cannot print,
    wherein
    the email analyzer analyzes the received second header information and requests the first email creator to create the third email including the third header information containing the status response when the second header information contains the status request, and
    the first email creator creates the third email and sends the third email to the destination external apparatus through the communication unit.

2. The image processing apparatus according to claim 1, further comprising:
    a request acquisition unit configured to acquire a request for transmission of the first email, wherein
    the second email creator creates the second email when the request acquisition unit acquires the request for transmission of the first email.

3. The image processing apparatus according to claim 1, wherein the second header information contains apparatus-specific information of the image processing apparatus as a sender.

4. The image processing apparatus according to claim 1, wherein
    the second email does not include a message body having image data and includes the second header information.

5. The image processing apparatus according to claim 1, further comprising a time counter configured to measure time, wherein
    the controller causes the time counter to measure time and, when not receiving the status response to the second email from the destination external apparatus for a specified period of time, the controller judges that the destination external apparatus cannot receive, and notifies the user of that judgment result.

6. The image processing apparatus according to claim 1, wherein
the second email creator adds a message disposition notification request to the second header information, and
the communication unit acquires the status response from the destination external apparatus by receiving an email of a message disposition notification response to the second email including the second header information.

7. The image processing apparatus according to claim 1, further comprising a division controller configured to divide the first email created by the first email creator into pieces in transmission units, and
the division controller sends the second email corresponding to the first email through the communication unit and sequentially sends the pieces of the first email through the communication unit when judging, based on the status response to the second header information, that the destination external apparatus can receive an email.

8. The image processing apparatus according to claim 1, further comprising:
an image reader configured to scan a document and create image data; and
a data converter configured to convert the image data created by the image reader into converted image data in a form attachable to an email.

9. The image processing apparatus according to claim 1, wherein
the first email, the second email, and the third email are sent and received by the image processing apparatus and the destination external apparatus via a server.

10. The image processing apparatus according to claim 1, wherein the first email creator creates the first email that includes the address of the destination external apparatus where the first email is to be sent.

11. The image processing apparatus according to claim 1 wherein the first email creator creates the first email that includes the address of the destination external apparatus where the first email is to be sent.

12. An image processing system, comprising:
a first image processing apparatus configured to scan a document; and
a second image processing apparatus configured to receive communication information sent from the first image processing apparatus, wherein
the first image processing apparatus includes:
an image reader configured to scan a document and create image data;
a data converter configured to convert the image data created by the image reader into converted image data in a form attachable to the communication information;
a communication unit configured to exchange communication information with the second image processing apparatus via a network;
a first communication information creator configured to, based on a user's request that includes an address of the second image processing apparatus where a first communication information is to be sent, create the first communication information which includes first header information and a communication information body and to which the converted image data converted by the data converter is attached;
a second communication information creator configured to create second communication information including second header information, and to send the second communication information to the second image processing apparatus through the communication unit after the address of the destination external apparatus has been designated by the user in the user's request and at the same time or before the image reader scans the document, the second header information containing a request for acquisition of a status of the second image processing apparatus and a third communication information request for third communication information from the second image processing apparatus;
a communication information analyzer configured to receive the third communication information from the second image processing apparatus through the communication unit and to analyze the third communication information to output an analysis result of whether the second image processing apparatus can print communication information; and
a controller configured to send the first communication information through the communication unit when the analysis result by the communication information analyzer is that the second image processing apparatus can print communication information, and alternatively to notify the user that the second image processing apparatus cannot print when the analysis result is that the second image processing apparatus cannot print,
the second image processing apparatus includes:
a communication unit configured to exchange communication information with the first image processing apparatus via a network;
a communication information analyzer configured to analyze the second communication information from the first image processing apparatus and to acquire the status request and third communication information request; and
a third communication information creator configured to create the third communication information containing a status response based on the analysis result by the communication information analyzer,
wherein
the communication information analyzer analyzes the received second header information and requests the first communication information creator to create the third communication information including the third header information containing the status response when the second header information contains the status request, and
the first communication information creator creates the third communication information and sends the third communication information to the destination external apparatus through the communication unit.

13. The image processing system according to claim 12, further comprising a server which the first communication information, second communication information, and third communication information pass through.

14. The image processing system according to claim 12, wherein
the second image processing apparatus further includes a printer configured to make a print based on the converted image data attached to the first communication information.

15. The image processing system according to claim 12, wherein the first communication information creator creates the first communication information that includes the address of the second image processing apparatus where the first communication information is to be sent.

* * * * *